United States Patent Office 2,987,382
Patented June 6, 1961

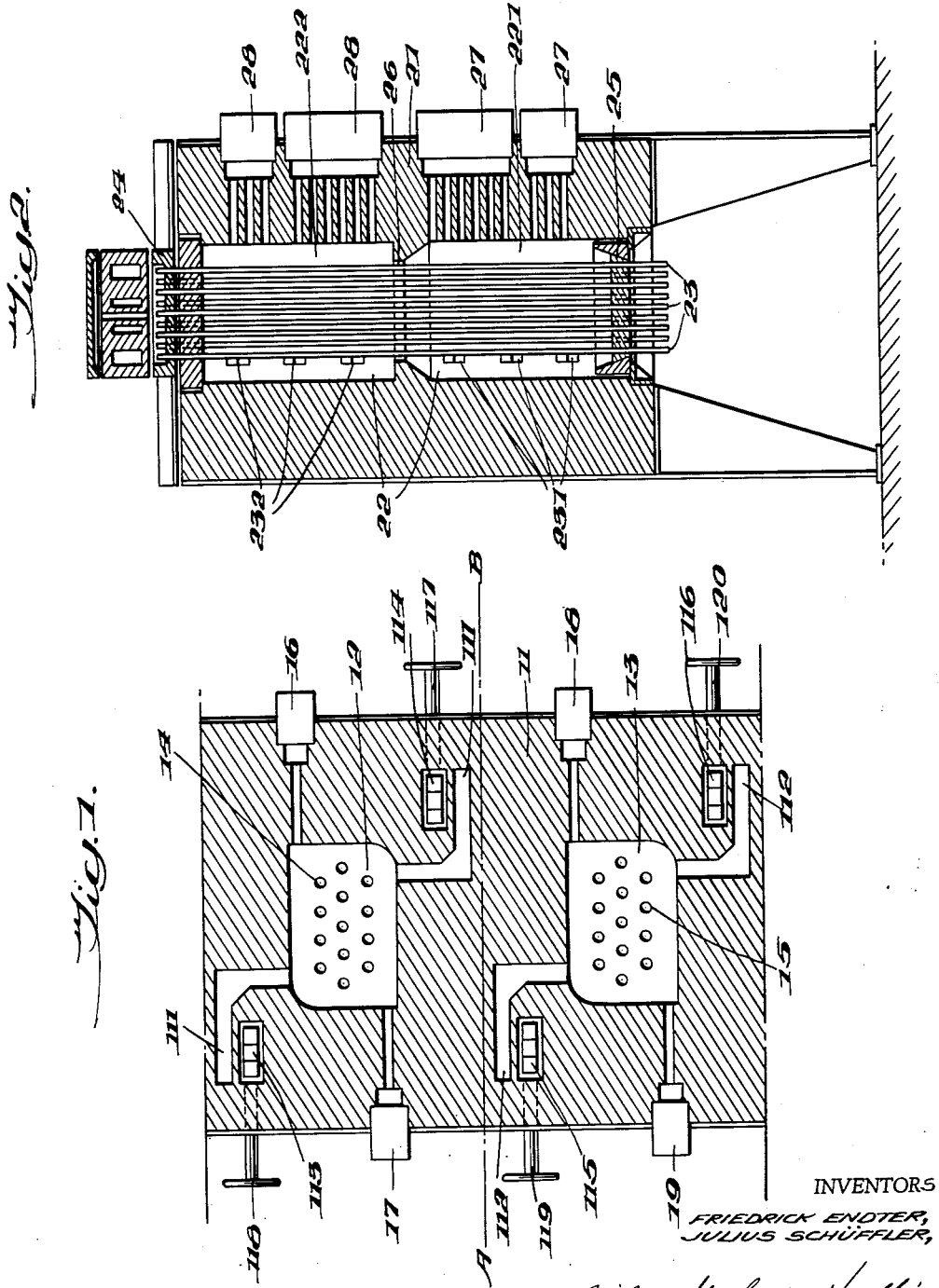

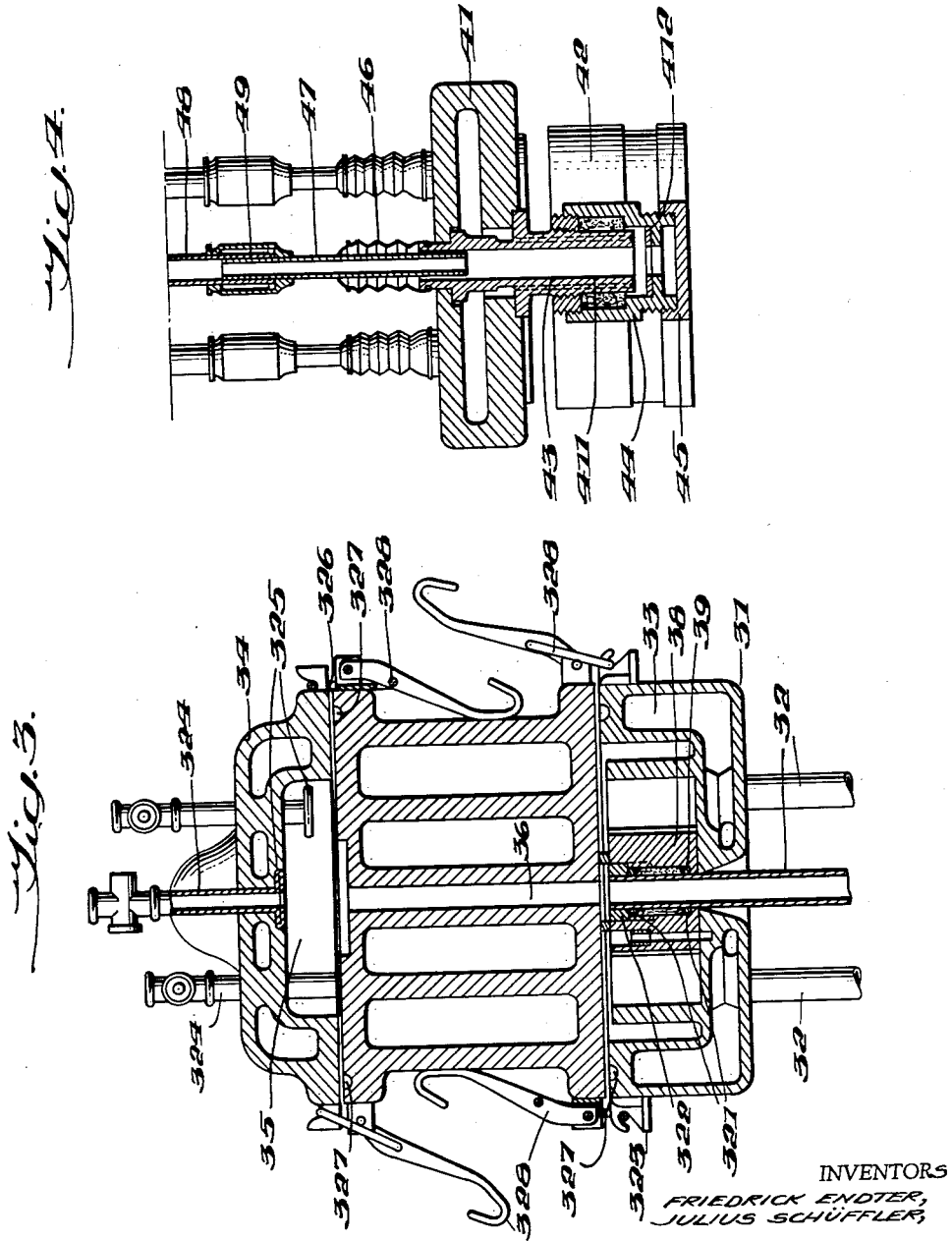

2,987,382
TUBE FURNACE FOR CARRYING OUT GAS REACTIONS IN CERAMIC TUBES
Friedrich Endter, Konstanz, Baden, and Julius Schüffler, Dusseldorf-Heerdt, Germany, assignors to Deutsche Gold- und Silber-Scheideanstalt vormals Roessler, Frankfurt am Main, Germany
Filed Sept. 16, 1955, Ser. No. 534,851
Claims priority, application Germany Sept. 18, 1954
3 Claims. (Cl. 23—288)

The present invention relates to a tube furnace for carrying out gas reactions, preferably, continuously, in which the actual reaction space consists of ceramic tubes. Such tube furnaces are especially adapted for carrying out gas reactions which are carried out at temperatures above 900° C. and especially those carried out at temperatures between 1000° and 1500° C., as at such temperatures metals do not have sufficient mechanical strength especially after continued operation. Furthermore, gaseous reactants may be present to which the metallic materials are not sufficiently resistant, so that also for these reasons inert ceramic materials, such as, the refractory metal oxides or mixtures thereof, had to be used for the construction of the reaction chambers. Furthermore, many high temperature gas reactions are of catalytic nature and under many circumstances metallic construction materials, even though they are not attacked under reaction conditions, can have an unfavorable influence upon the reactions.

Even though there has been a long felt need for tube furnaces, especially for high temperature reactions, for industrial purposes, there previously has been no successful solution of the problem of producing a tube furnace which was really suited for continued use. The difficulties which are encountered with continuous use of ceramic tube furnaces are primarily engendered by the high mechanical sensitivity of even the best ceramic materials, by their relatively low heat conductivity in comparison to metals and by their susceptibility to temperature changes. In addition, the thermal expansion of the ceramic tubes cannot be overlooked as it often causes strains exceeding the mechanical strength of the tubes and can lead to the destruction thereof. For this reason, it has already been suggested to arrange ceramic tubes of considerable size vertically and to fix them only at one face of the heating chamber or in other words to hang the tubes in the furnace in such a way that sufficient play is provided both along and transverse to the axis of the tubes to prevent occurrences of undue stresses. The free ends of the tubes were sealed with respect to the furnace housing with the aid of plates attached to the tubes which were movable with such tubes. Such plates, if desired, were also cooled.

All of the prior suggestions however did not lead to practical success as they did not provide furnace constructions having a really reliable operation with long life of the valuable ceramic tubes and with the required heat economy. A substantial disadvantage of all of the known tube furnaces with ceramic tubes resided in that in dividing the reaction chamber into a plurality of separate tubes, it was not possible to provide the necessary uniformity of temperature along the length of the tubes required for the stability of the tubes and furthermore, whether the tubes were charged separately or jointly, the often occurring failure of a single tube required that the whole furnace be shut down. It is obvious that under such circumstances a reliable and uniform operation such as is required in technical installations was not possible.

In accordance with the present invention, the tube furnaces for carrying out gas reactions, preferably, at temperture above 900° C., are provided with ceramic tubes which are hung in the heating chamber and a large number thereof are connected to common gas supply means and a common gas withdrawing means and furthermore are arranged so that they may individually be disconnected from the gas supply and/or gas outlet lines so that the reaction may continue undisturbed in the remaining tubes and be individually removed from the furnace without interrupting the operation of the furnace.

With the furnace construction according to the invention, a single tube, in a group or bundle of tubes, in a common heating chamber is no longer determinative for carrying out the whole gas reaction and even when one or more tubes breaks or does not function in the desired manner the process can be continued without qualitative alteration in the course of the reaction and therefore without change in the composition of the reaction products. The latter in often of considerable importance when reactions are carried out in the ceramic tubes with the aid of sensitive catalysts. For example, it can easily happen that the catalyst in one or more of the tubes does not work as well as that contained in the remaining tubes and special measures must be taken for the regeneration thereof or the operation of the entire group of tubes had to be oriented with regard to the least active catalyst tube, or in other words, for example, the gas load, the temperature or the gas composition had to be selected in order that a uniform product still be obtained. With the furnace construction according to the invention the operation of the remaining tubes of a group of tubes can continue unaltered even when some special action need be taken with regard to the catalyst in one or more of the tubes, such as, for example, reforming the catalyst, burning it off or similar regeneration measures.

Aside from the basic characteristics of the tube furnace according to the invention, namely, that the individual tubes may easily be separated from the remaining tubes without disturbing the operation of the whole installation, there are a number of other characteristics which can be employed separately or in combination to provide additional advantages in solving the problem of providing a tube furnace of reliable operation with optimum heat economy and with excellent life of the tubes despite the difficulties normally encountered with the use of ceramic tubes.

As indicated above, the total reaction space in furnaces for carrying out reactions of the type concerned according to the invention generally is subdivided into a plurality of individual spaces, preferably in a plurality of individual tubes, as, on one hand, ceramic tubes are not available in all desired dimensions and, on the other hand, especially when catalytic reactions are concerned, in order to obtain a favorable catalyst surface to volume ratio especially when the catalyst is applied as a coating or is supported by the walls of the tube. The same also is true for non-catalytic reactions in which the ratio wall area to reaction space volume is of significance. With the furnace according to the invention the number of tubes can be unlimited as because of the possibility of disconnecting each individual tube, the required reliability in operation for the entire installation is assured. However, in a preferred modification according to the invention the large number of tubes are subdivided into groups or bundles of tubes, each of which is provided with its own heating chamber.

Such a heating chamber, of which a number can be provided in one furnace unit, is expediently provided with its own heating installation which can be operated independently of the heating of the other heating chambers. The heat is supplied to the heating chamber preferably by a plurality of individually controllable burners operating on a fuel-air mixture. It is possible thereby to control the temperature distribution at will along the tube group or tube bundle within the heating chamber and to adapt it to the conditions at hand. This is of considerable importance in carrying out endothermic gas reactions, as under certain circumstances, depending upon the relationship between the heat capacities of the reaction participants to the heat of reaction at the location in the tube where the greatest conversion takes place, the greatest heat requirement can also occur at such location and this can be met without unduly disturbing the temperature distribution along the tube.

For sake of heat economy, the furnaces according to the invention are provided with heat recuperators or regenerators with the aid of which the heat contained in the flue gas from the burners can to a considerable degree be transferred to fuel gas or air of combustion or both. Also, the preheating of the reaction components themselves is possible in this manner. According to a preferred modification of the furnaces according to the invention, in which a plurality of heating chambers are provided, each containing a group of tubes, each heating chamber is provided with a separate recuperator which preferably can be controlled independently of the recuperators for the other heating chambers. For example, one can provide for regulatable exhaust flues for the flue gases with different or regulatable cross-sections by providing a slide valve accessible from the exterior for such purpose.

In the accompanying drawings:

FIG. 1 shows a horizontal cross-sectional view of a furnace according to the invention;

FIG. 2 shows a vertical sectional view of another modification of a furnace according to the invention;

FIG. 3 shows a vertical sectional view of a preferred form of head which carries the ceramic tubes of the furnace according to the invention; and FIG. 4 shows a vertical sectional view of a preferred form of closure for the lower end of the free hanging ends of the ceramic tubes of the furnace according to the invention.

In FIG. 1, 11 represents the oven body consisting of usual insulation material which contains two vertical heating chambers 12 and 13, and groups 14 and 15 of vertically disposed ceramic tubes are respectively provided in such heating chambers. Heating chambers 12 and 13 are heated, for example, with the aid of burners 16 and 17, and 18 and 19, the flue gases of which are taken up by flue gas channels 111 and 112. The recuperators associated with each heating chamber in this instance for preheating the combustion air are designated at 113, 114, 115 and 116, and regulators 117, 118, 119 and 120 are provided for each of such recuperators.

In the modification shown in FIG. 1, the furnace unit is to a certain extent composed of two similar basic components which are located on each side of the line A—B. Each basic component consists of a heating chamber, the group of tubes contained therein and the burners and recuperators associated therewith. It will be apparent, that it is possible to enlarge a furnace according to the invention by the addition of further basic components thereto to produce a furnace of high capacity containing a large number of tubes to provide a large reaction space, without affecting the reliability of operation of the installation as, according to the invention, each of the individual tubes, as well as a group of such tubes, can be disconnected from the remaining tubes. A furnace according to the invention containing a plurality of heating chambers each containing a group of tubes also renders it possible to carry out a series of reaction steps in the same furnace unit but in different heating chambers whereby not only the temperature of each reaction chamber but also the catalyst can be different from chamber to chamber.

When it is not necessary to be able to multiply the number of basic components to obtain a furnace unit of sufficient size, another form of construction can be employed in which the group of tubes is annularly disposed around a flue for drawing off the heating gases or around a heating shaft. In the first instance the heating of the annular group of tubes can be effected with individual burner aggregates but the flue gases thereof must be drawn off together whereas in the second instance the flames which burn in the central heating shaft or respectively their combustion gases, uniformly heat the surrounding annular group of tubes. The manifold variations possible for the supply and withdrawal of heat of the preferred modification shown in FIG. 1 cannot, however, be realized to the same degree in the last named simpler modification. However, such simpler modification can be utilized when easily controlled reactions are to be carried out in furnaces according to the invention.

The measures described above are significant above all for the optimum utilization of heat and the uniform temperature distribution along the reaction tubes to increase the reliability of operation of the furnace as well as to increase its life. Additional improvements and greater reliability in operation can be achieved if care is taken that the spacing between the reaction tubes and the heating flames as well as the radiating walls of the heating chamber is such that the flames essentially burn in the space between the reaction tubes and the walls without touching the tubes themselves. Also, the thickness of the walls of the ceramic reaction tubes is not without influence on the life of the tubes and their sensitivity to temperature change. It was found that good results are obtained when the thickness of the walls of the ceramic reaction tubes does not exceed 4 mm. and preferably lies between 1 and 3 mm.

As previously indicated, especially when endothermic catalytic reactions are concerned, a higher requirement for heat can occur in that portion of the reaction space, that is, reaction tube, where the reaction essentially takes place. It is of course of advantage to supply an increased quantity of heat to the interior of the reaction tubes in such portions of the tube to provide for a rapid progress of the reaction and to provide a uniform temperature for the tubes. On the other hand, because of the lack of stability of the tubes to temperature change, as well as the sensitivity of the reaction products or catalyst to heating, an unlimited supply of heat to the gases undergoing reaction must be avoided.

In a preferred modification of the furnace according to the invention, a locally limited increased supply of heat to the interior of the reaction tubes from the heating chambers is obtained by increasing the velocity of flow of the heating gases in the heating chamber parallel to the reaction tubes along that portion of the tubes where the higher heat requirements must be fulfilled. In this modification of the invention the interior of the heating chamber is provided with one or more collar-like constrictions. These constrictions divide the heating chamber into two or more portions, each of which can be provided with separate outlets for the heating gases to permit separate withdrawal of the heating gases before and after the location where their velocity is increased. In order to assist in the separate and independent heat control in the enlarged portions of the heating chamber which are separated by the aforementioned constrictions, a plurality of independently operable burners or burner groups can be provided in the individual portions so that differential heating can be effected along the length of the reactor tubes with the aid of such individually operable burners or burner groups.

The cross-section of free space within the constriction of the heating chamber preferably should correspond to the cross-section of the space which is taken up by the reactor tubes. Instead of the collar-like constrictions in the heating chambers mentioned, it is also possible in another modification of the furnace according to the invention to employ one or more perforated plates with passages for the reaction tubes and for the heating gases along such tubes.

FIG. 2 shows by way of example a furnace construction with heating chambers provided with a collar-like constriction. In such figure, 21 designates the furnace shell of insulating material containing heating chamber 22 in which a plurality of reactor tubes 23 are located. The reactor tubes 23 are firmly supported and hung from head 24 and leave the lower end of the furnace shell through perforated plates 25 with sufficient play. A collar-like constriction 26 is located about in the center of the heating chamber which serves to accelerate the heating gases flowing upwardly through the heating chamber so that an increased quantity of heat is transferred to the tubes in the region behind the constriction. The portions 221 and 222 of the heating chamber formed by constriction 26 are heated by burner groups 27 and 28 which permit a different and independent supply of heat to each of such portions of the heating chamber. Each of such portions of the heating chamber is also provided with a plurality of flues 231 and 232 in which the draft can be regulated independently of each other which lead to the recuperator.

While a sharp temperature change because of differing heat requirements of the reactor tubes can be avoided in the furnace in the manner described above, it is sometimes essential, especially with high temperature heating chambers, to prevent too rapid a temperature drop at the end of the tube leaving the actual heated zone and to maintain as flat as possible a temperature curve in the free hanging end of the reactor tubes. For this purpose one advantageously can employ a perforated plate for closing off the lower end of the heating chamber through the perforations of which the free ends of the tubes extend with sufficient lateral play. Preferably the walls of the perforations are conically shaped so that they diverge in the direction towards the interior of the furnace.

As has already been repeatedly indicated, the essential feature of the furnace according to the present invention is that the individual ceramic tubes of a plurality of tubes operated in parallel employed for gas reactions and especially catalytic gas reactions can be operated under individual conditions or be disconnected from the remaining tubes and that means are provided so that individual tubes can be removed from the furnace without shutting down the entire furnace, or substantially changing its operating conditions.

The object of the invention is best achieved by hanging the individual reactor tubes of a tube group or bundle gas tight from a common head. This head is provided with a number of channels leading to a common gas chamber which corresponds to the number of tubes held thereby and means are provided to shut off the openings of the individual channels from the common gas chamber and if desired to connect the individual channel with a special gas line for the reactor tube connected with such channel. When the reaction gases are passed upwardly through the reactor tubes so that the hot reacted gases enter the head supporting the hanging reactor tubes, such head is expediently provided with cooling means regulated with regard to the velocity of the gas stream and the temperature requirements.

A preferred modification of the head for supporting the reactor tubes which forms an integrated part of the furnace according to the invention is shown in FIG. 3. In such figure, head 31 supports reactor tubes 32 and is provided with cooling spaces 33. The top of head 31 is closed with lid 34 which contains the common gas chamber 35. A heat exchanger containing channels 36 provides a gas tight joint between head 31 and lid 34. If the cooling length provided by the heat exchanger is not sufficient, it is possible to place a plurality of such heat exchangers between the lid and head.

The upper ends of reactor tubes 32 are inserted into head 31 so that they are substantially flush with its upper edge. Fixed holders 38 which are of a metal of high heat conductivity serve to support the tubes within the head. It is advisable to prevent direct contact between the ceramic tubes with the metal holder in order to prevent too sharp a drop in temperature in the end of the hot ceramic tube. For this reason a temperature stable insulating packing is disposed between the ceramic tube and the metallic holder. This packing in the modification shown in the drawings consists of asbestos rings 39 held on both sides by ceramic rings and compressed by a threaded ring 322. This packing provides a reliable temperature stable seal without subjecting the end of the ceramic tube to undue thermal and mechanical stresses.

Extensions 323 at the upper end of head 31 serve to support the head upon the upper edge or counter bearings of the heating chamber of the furnace or respectively on the perforated plates provided with passages for the reactor tubes which serve to close off the top of the heating chamber. It is advantageous where the head is held by supports whose supporting parts are heated by the heat of the furnace in such a manner that their longitudinal expansion approximately equals that of the ceramic tubes as in this way only relatively small displacements need be compensated for by flexible connections.

The closure of the individual reactor tubes or respectively the channels leading to the common gas chamber 35 is preferably effected with tubes 324 which are threaded in lid 34 so that they can be raised and lowered. The lower ends of tubes 324 are provided with plate like sealing elements 325 which seat in depressions 326 at the end of channels 36 when tubes 324 are lowered. The closure means described renders it possible to close off each individual channel 36 and the reactor tube associated therewith from the common gas chamber 35 and to lead off the gases from the reactor tube concerned separately. Furthermore, such closure means renders it possible, for example, to analyze the exhaust gases from each reactor tube individually and renders it possible to introduce temperature measuring instruments into the ceramic tubes through the T which serves to close off tubes 324 in order to observe the temperature and thereby the course of the reaction in each tube without disturbing the operation of the other reactor tubes.

If heat exchanger 36 is not required, lid 34 is placed directly over head 31. In such instance, depressions such as depressions 326 would be provided in the face of the head to receive and seat sealing elements 325. It is expedient to form the head, lid and heat exchanger so that they can be simply and quickly assembled and demounted. As shown in FIG. 3, this is achieved by having the adjoining surfaces as flat as possible and providing seals 327 and employing simple closure means such as lever operated clasps 328 to join the head, heat exchanger and lid together in a gas tight manner.

Fundamentally the same arrangement as has been described in connection with FIG. 3 can also be employed for closing off the lower free ends of the reactor tubes as long as short tubes, metallic if desired, are inserted into the head and these are joined with the lower ends of the ceramic tubes extending through the bottom of the heating chamber over a flexible coupling. In this way the bottom ends of the tubes also can be individually closed off from the common gas chamber and the gas may be individually withdrawn or supplied to the individual ceramic tubes.

In order that the lower end of the ceramic reactor tubes be made easily accessible and to render it possible to remove an individual tube in case of failure, the following element which essentially consists of a gas distributor having a common gas chamber and orifices which are flexibly, if desired over intermediate tubes, connected to the reactor tubes. The gas distributor contains a conducting body for each reactor tube having a bore which can be closed from outside and which is larger than the outer diameter of the reactor tube. The conducting body is also provided with channels which connect the inner bore with the common gas chamber and such channels are provided with closure means. Such an arrangement is shown by way of example in FIG. 4. In such figure, the common gas chamber 41 carries a regulating head 42 for each separate reactor tube, and such regulating head contains conductor body 43, regulating sleeve 44 and closure lid 45. Gas chamber 41 is joined with the aid of flexible sheathing, for example, of silicon rubber, rubber or other plastic gas tight materials and metal tube 47 with the end of ceramic regulator tube 48. The metal tube 47 is joined to ceramic tube by a gas tight cement at 49. Channels or conduits 411 are provided in conductor body 43. These channels on one side connect with the inner bore of the conductor body and on the other side with the common gas chamber 41. Regulating sleeve 44 is threaded on conductor body 43 and an annular elastic sealing ring 412 is provided at its lower end so that when the regulating sleeve is raised channels 411 can be tightly closed and when it is lowered such channels can communicate with the inner bore of the conductor body to connect such bore with the common gas chamber. Removable lid 45 renders the inner bore of conductor body 43 as well as the reactor tube 48 accessible without rendering it necessary to cut off the remaining reactor tubes as the reactor tube concerned can be shut off from the common gas chamber 41 with the aid of regulating sleeve 44. Of course in such instance it is also necessary to shut off the upper end of the reactor tube in the upper head as has been described with reference to FIG. 3. For example, after the upper and lower ends of the reactor tube in question have been shut off from the respective common gas chambers, lid 45 can be opened and the tube if damaged can be pulled down and removed. Also in the same manner pressure measuring instruments can be introduced into the individual reactor tubes. Also it is possible to pass gases through an individual tube which is different from those employed in the remaining tubes so that, for example, the catalyst in a tube operating unsatisfactorily can be regenerated. The accessibility to the lower ends of the reactor tubes can also be employed to replace filling materials in the reactor tubes. As the filling materials after closing lid 45 rest upon such lid they do unduly burden the sensitive ceramic tubes. The arrangement has also proved useful for introducing preheated gases or gas mixtures into the individual or all of the reactor tubes as one can introduce a hot gas with the aid of an auxiliary tube directly up to about the ceramic part and introduce a regulated quantity of cool gas through the channels in conductor body 43 with the aid of regulating sleeve 44 in order to provide a cushion between the hot gas and the location where it is introduced.

For furnaces according to the present invention which are to be operated at relatively low temperatures, such as, 900 to 1000° C., it is possible to employ reactor tubes which have been coated or clad with scaling resistant metals or ceramets (mixtures of metals and ceramics).

The tube furnace according to the invention is especially adapted for carrying out complicated and sensitive gas reactors which in order to obtain high yields and pure reaction products must be carried out within narrow temperature ranges and with subtile catalysts. For example, furnaces according to the invention have proved very successful for the production of hydrocyanic acid from methane and ammonia at a temperature of 1200° C. with catalysts of the platinum group. Just such a process in which from time to time formation or regeneration of the catalyst in individual tubes may be required clearly shows the advantages of the furnace, as all of such operations can be carried out on individual reactor tubes without disturbing the operation of the other tubes or contaminating or diluting the reaction product obtained. For example, it is possible, after lowering closure elements 324 and 325 and also closing channels 411 with the aid of regulating sleeve 44, to open lid 45 and pass any desired gas, such as, oxygen or air, through the reactor tube concerned to form the catalyst or to burn off by-products such as carbon black contained in the tube. If desired, instead of opening lid 45, this lid can be provided with closable openings for the introduction of such gases. In view of the construction of closure elements 324 and 325, the gases produced escape and do not contaminate the reaction products produced in the other tubes. The escaping gases can either be burned at the mouth of tubes 324 or be collected there separately from the reaction products.

If, on the other hand, it is desired not to influence the catalyst in a tube which is not operating properly because of the difference in activity of the catalysts with respect to the remaining tubes, it is possible to shut off the tubes concerned from common gas chamber 41 which supplied the gas mixture to the remaining tubes and to introduce a gas mixture suited to the condition of the catalyst concerned directly into the bore of conducting element 43. Furthermore, if desired, the quantity of reactant gases supplied to the individual reactor tubes can be individually adjusted by providing different opening cross-sections at channels 411 with the aid of regulating sleeve 44. This adjustment can be improved by providing channels 411 with nozzle like openings.

We claim:

1. A tube furnace for carrying out high temperature gas reactions, comprising a heating chamber, means for heating the heating chamber, a plurality of ceramic reactor tubes hung gas tight from their upper ends in the heating chamber by a common head, separate channel means within said head connecting each of the upper ends of the separate reactor tubes with openings to a common gas chamber in said head, means for individually connecting the lower ends of each of said reactor tubes to another common chamber, gas supply means connected to one of said common chambers, gas withdrawal means connected to the other of said common chambers, valve means operable from the outside of said head for individually disconnecting each individual tube from said common gas chamber in said head during the operation of the furnace, valve means for individually disconnecting each individual tube from said other common gas chamber during the operation of the furnace and means permitting removal of individual tubes during operation of the furnace, each of said valve means for individually disconnecting each individual tube from said common gas chamber in said head comprising a tube adapted to be raised and lowered extending from outside of the head into the gas chamber aligned with one of the openings in said gas chamber, said tube carrying an annular flange at its lower end of a greater diameter than the opening with which the tube is aligned, seating means to receive said annular flange surrounding the opening to receive said flange and close the opening into the gas chamber when the tube is lowered and means for closing the end of the tube extending from the head.

2. A tube furnace for carrying out high temperature gas reactions, comprising a heating chamber, means for heating the heating chamber, a plurality of ceramic reactor tubes hung gas tight from their upper ends in the heating chamber by a common head, separate channel means within said head connecting each of the upper ends of the separate reactor tubes with openings to a common gas chamber in said head, means for individually connecting the lower ends of each of said reactor tubes to another common chamber, gas supply means connected to one of said common chambers, gas withdrawal means connected to the other of said common chambers, valve means operable from the outside of said head for individually disconnecting each individual tube from said common gas chamber in said head during the operation of the furnace, valve means for individually disconnecting each individual tube from said other common gas chamber during the operation of the furnace and means permitting removal of individual tubes during operation of the furnace, the lower end of each of the reactor tubes being elastically connected to an individual tubular conducting body, the bore of which is greater than the outside diameter of the reactor tube with which it is associated, conduit means in the wall of each of said individual tubular bodies for individually connecting the other common gas chamber with the bore of the tubular conducting body, individual means for closing off each of said tubular conductor bodies and individual means associated with each of said tubular conducting bodies for closing off said conduits for individually disconnecting each individual tube from said other common gas chamber.

3. A tube furnace for carrying out high temperature gas reactions, comprising a heating chamber, means for heating the heating chamber, a plurality of ceramic reactor tubes hung gas tight from their upper ends in the heating chamber by a common head, separate channel means within said head connecting each of the upper ends of the separate reactor tubes with openings to a common gas chamber in said head, means for individually connecting the lower ends of each of said reactor tubes to another common chamber, gas supply means connected to one of said common chambers, gas withdrawal means connected to the other of said common chambers, valve means operable from the outside of said head for individually disconnecting each individual tube from said common gas chamber in said head during the operation of the furnace, valve means for individually disconnecting each individual tube from said other common gas chamber during the operation of the furnace and means permitting removal of individual tubes during operation of the furnace, the lower end of each of the reactor tubes being elastically connected to an individual tubular conducting body, the bore of which is greater than the outside diameter of the reactor tube with which it is associated, conduit means in the wall of each of said individual tubular bodies for individually connecting the other common gas chamber with the bore of the tubular conducting body, a regulating sleeve threaded upon the lower end of each of said tubular conductor bodies carrying a sealing element adapted to open and close said conduit in the wall of said conductor body upon rotation of said regulator sleeve and a removable cap on the lower end of said regulator sleeve for individually disconnecting each individual tube from said other common gas chamber.

References Cited in the file of this patent

UNITED STATES PATENTS

| | | |
|---|---|---|
| 1,904,441 | Freyermuth et al. | Apr. 18, 1933 |
| 2,028,326 | Hanks et al. | Jan. 21, 1936 |
| 2,645,566 | Stookey | July 14, 1953 |